(12) United States Patent
Naik et al.

(10) Patent No.: US 11,575,716 B2
(45) Date of Patent: Feb. 7, 2023

(54) APPARATUSES AND METHODS FOR PROVIDING RELIABLE DELIVERY OF APPLICATION DATA

(71) Applicant: MEDIATEK INC., Hsinchu (TW)

(72) Inventors: Rohit Naik, Hsinchu (TW); Chieh-Fu Chiu, Hsinchu (TW); Shu-Lin Yang, Hsinchu (TW); Ssu-Hsien Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/365,041

(22) Filed: Jul. 1, 2021

(65) Prior Publication Data

US 2023/0007053 A1 Jan. 5, 2023

(51) Int. Cl.
*H04L 65/1016* (2022.01)
*H04L 65/1069* (2022.01)
*H04L 65/1104* (2022.01)

(52) U.S. Cl.
CPC ...... *H04L 65/1016* (2013.01); *H04L 65/1069* (2013.01); *H04L 65/1104* (2022.05)

(58) Field of Classification Search
CPC ............ H04L 65/1016; H04L 65/1104; H04L 65/1069; H04L 65/80
USPC ....................................................... 709/227
See application file for complete search history.

(56) References Cited

U.S. PATENT DOCUMENTS

2014/0153489 A1 6/2014 Perras et al.

FOREIGN PATENT DOCUMENTS

| CN | 102325355 A | | 1/2012 | |
|---|---|---|---|---|
| CN | 102484849 A | * | 5/2012 | ......... H04L 65/1016 |
| TW | 201304481 A | | 1/2013 | |

OTHER PUBLICATIONS

Chinese language office action dated Feb. 16, 2022, issued in application No. TW 110132965.

* cited by examiner

*Primary Examiner* — Glenford J Madamba
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a mobile communication network. The controller determines whether the mobile communication network supports IMS services. The controller establishes a Packet Data Network (PDN) connection or a Protocol Data Unit (PDU) session with the mobile communication network for the IMS services via the wireless transceiver in response to the mobile communication network supporting the IMS services. The controller sends application data on the PDN connection or PDU session via the wireless transceiver.

16 Claims, 13 Drawing Sheets

| Type | Unique syntax to identify Type | Unique syntax to identify APP/GAME | APP/GAME unique ID | BW required | TAG value to be used in SDP "i" parameter | Codecs to be used | SDP parameters |
|---|---|---|---|---|---|---|---|
| Gamming | Gamming data | GAME-ID# | 1234 | 256 Kbps | i=Gamming data GAME-ID#1234 | Audio: AMR-WB, EVS | s=IMSDoPS Session; i=Gamming data GAME-ID#1234; m=audio; |
| Gamming | Gamming data | GAME-ID# | 3456 | 512 Kbps | i=Gamming data GAME-ID#3456 | Audio: AMR-WB, EVS; Video: H.263,H.264 | s=IMSDoPS Session; i=Gamming data GAME-ID#3456; m=audio; m=video; |

FIG. 4A

| FIG. 4A |
| FIG. 4B |

| Application data | APP-ID# | AR-VR | 512 Kbps | i=Application data APP-ID#AR-VR | Audio: AMR-WB, EVS; Video: H.264,H.265 | s=IMSDoPS Session; i=Application data APP-ID#AR-VR; m=audio; m=video; |
|---|---|---|---|---|---|---|
| Application data | APP-ID# | MEDI CAL- 123 | 512 Kbps | i=Application data APP-ID#MEDI CAL-1234 | Audio: AMR-WB, EVS; Video: H.263,H.264 | s=IMSDoPS Session; i=Application data APP-ID# MEDICAL-1234; m=audio; m=video; |

FIG. 4B

APPARATUSES AND METHODS FOR PROVIDING RELIABLE DELIVERY OF APPLICATION DATA

BACKGROUND OF THE APPLICATION

Field of the Application

The application generally relates to mobile communications and, more particularly, to apparatuses and methods for providing reliable delivery of application data.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In a 4G/5G network, an IP Multimedia Subsystem (IMS) may be deployed to provide a reliable way of establishing a signaling plane between two or more UEs. For example, in Voice over LTE (VoLTE) or Voice over NR (VoNR), the audio data is transmitted over this signaling plane to provide reliability and dedicated Quality of Service (QoS).

BRIEF SUMMARY OF THE APPLICATION

The present application proposes solutions for providing a reliable way of delivering specific application data, such as gaming data, Virtual Reality (VR)/Augmented Reality (AR)/Mixed Reality (MR) data, and medical data. In a session based solution, the application data is allowed to be delivered over a Real-Time Protocol (RTP) stream established in an IMS session (e.g., an IMS Voice over Packet-Switched (IMSVoPS) session, or an IMS Data over PS (IMSDoPS) session), with or without the operator (e.g., the operator of a mobile communication network) being aware of this particular data-delivery scenario. In a non-session based solution, the application data is allowed to be delivered in a Session Initiation Protocol (SIP) message (e.g., in a Short Message Service (SMS) message within the SIP message), without the operator being aware of this particular data-delivery scenario.

In one aspect of the application, a User Equipment (UE) comprising a wireless transceiver and a controller is provided. The wireless transceiver is configured to perform wireless transmission and reception to and from a mobile communication network. The controller is configured to determine whether the mobile communication network supports IMS services, establish a Packet Data Network (PDN) connection or a Protocol Data Unit (PDU) session with the mobile communication network for the IMS services via the wireless transceiver in response to the mobile communication network supporting the IMS services, and send application data on the PDN connection or PDU session via the wireless transceiver.

In another aspect of the application, a method executed by a UE is provided. The method comprises the following steps: determining whether a mobile communication network supports IMS services; establishing a PDN connection or a PDU session with the mobile communication network for the IMS services in response to the mobile communication network supporting the IMS services; and sending application data on the PDN connection or PDU session.

In one embodiment, the IMS services comprise IMS voice services. Furthermore, the UE may send a first Session Initiation Protocol (SIP) INVITE message comprising Session Description Protocol (SDP) attributes which indicate using an audio or video Real-Time Protocol (RTP) stream to send the application data on the PDN connection or PDU session. For example, the SDP attributes comprise a session name field indicating an IMSDoPS session, a session information field indicating a type and an identifier of the application data, and a media information field indicating audio or video RTP. Furthermore, the UE may send a second SIP INVITE message to initiate a voice call session prior to sending the first SIP INVITE message, wherein the first SIP INVITE message is sent to modify the voice call session to an IMSDoPS session. Alternatively, the application data may be sent in a SIP message.

In another embodiment, the IMS services comprise IMS data services. Furthermore, the UE may send a SIP INVITE message comprising header fields indicating to use an audio or video RTP stream to send the application data on the PDN connection or PDU session. For example, the header fields comprise a subject indication that indicates an IMSDoPS session, and a reason indication that indicates a type and an identifier of the application data.

Other aspects and features of the present application will become apparent to those with ordinarily skill in the art upon review of the following descriptions of specific embodiments of the apparatuses and methods for providing reliable delivery of application data.

BRIEF DESCRIPTION OF THE DRAWINGS

The present application can be more fully understood by reading the subsequent detailed description and examples with references made to the accompanying drawings, wherein:

FIGS. 4A and 4B show an example of said configuration regarding the mappings of applications to corresponding parameters for the operator unaware mode;

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
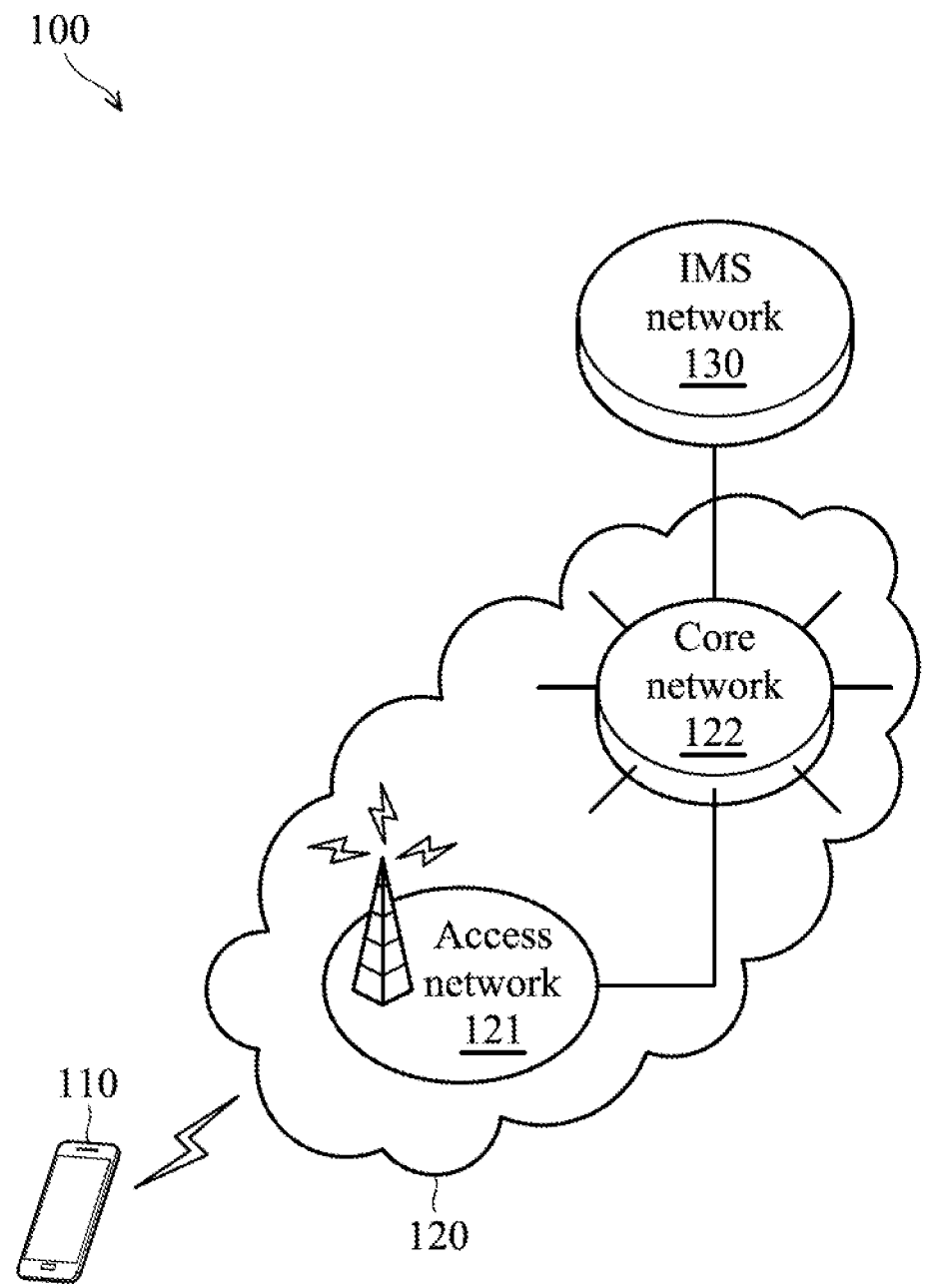
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a User Equipment (UE) 110, a mobile communication network 120, and an IP Multimedia Subsystem (IMS) network 130 (e.g., deployed by the operator of the mobile communication network 120). In another embodiment, the IMS network 130 may be incorporated into the mobile communication network 120.

The UE 110 may be a feature phone, a smartphone, a panel Personal Computer (PC), a laptop computer, a Machine Type Communication (MTC) device, or any mobile communication device supporting the RATs utilized by the mobile communication network 120. The UE 110 may connect to the mobile communication network 120 to obtain voice and/or data services.

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks (e.g., the IMS network 130 and/or the Internet).

In one embodiment, if the mobile communication network 120 is a 4G network (e.g., an LTE/LTE-A/TD-LTE network), the access network 121 may be an Evolved-Universal Terrestrial Radio Access Network (E-UTRAN) and the core network 122 may be an Evolved Packet Core (EPC). The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

In one embodiment, if the mobile communication network 120 is a 5G network (e.g., an NR network), the access network 121 may be a Next Generation Radio Access Network (NG-RAN) and the core network 122 may be a Next Generation Core Network (NG-CN). The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

The IMS network 130 is a system consisting of various network functions for providing IP multimedia services to the UE 110 over the mobile communication network 120. For example, the IMS network 130 may include an IMS core which at least includes a Home Subscriber Server (HSS), a Call Session Control Function (CSCF), a Signaling Gateway (SGW), a Media Gateway Control Function (MGCF), and a Media Resource Function (MRF). The HSS generally refers to the master database that maintains all user profile information used to authenticate and authorize subscribers. The CSCF is the heart of the IMS architecture, which is responsible for controlling sessions between endpoints (referred to as terminals in the IMS specifications) and applications. The SGW and the MGCF are responsible for providing interoperability with the Public Switched Telephone Network (PSTN). The MRF provides media-related functions such as the playing of tones and digital announcements.

The IP multimedia services provided by the IMS network 130 may include IMS voice services and/or IMS data services. Specifically, the IMS voice services (also called IMS Voice over Packet-Switched (IMSVoPS) services) may refer to IMS services that involve voice component, such as Voice over LTE (VoLTE), Video over LTE (ViLTE), Voice over NR (VoNR), and Video over NR (ViNR), etc., while the IMS data services (also called IMS Data over PS (IMSDoPS) services) may refer to IMS services that do not involve voice component, such as Short Message Service (SMS) over IMS, Mission Critical Push To Talk (MCPTT), Mission Critical Video (MCVideo), Mission Critical Data (MCData), Rich Communication Services (RCS), XML Configuration Access Protocol (XCAP), and others.

In one embodiment, the UE 110 may support one or both of the IMS voice services and the IMS data services of the IMS network 130. Likewise, the mobile communication network 120 may support one or both of the IMS voice services and the IMS data services of the IMS network 130, depending on the service deployment scenarios of the operator.

In accordance with one novel aspect, a session based solution for providing a reliable way of delivering specific application data, such as gaming data, Virtual Reality (VR)/Augmented Reality (AR)/Mixed Reality (MR) data, and medical data, is proposed. Specifically, the UE 110 may send application data over a Real-Time Protocol (RTP) stream established in an IMS session (e.g., an IMSVoPS/IMSDoPS session), with or without the operator being aware of this particular data-delivery scenario.

In accordance with another novel aspect, a non-session based solution for providing a reliable way of delivering specific application data is proposed. Specifically, the UE 110 may send application data in a Session Initiation Protocol (SIP) message (e.g., in a Short Message Service (SMS) message within the SIP message), without the operator being aware of this particular data-delivery scenario.

Figure 2:
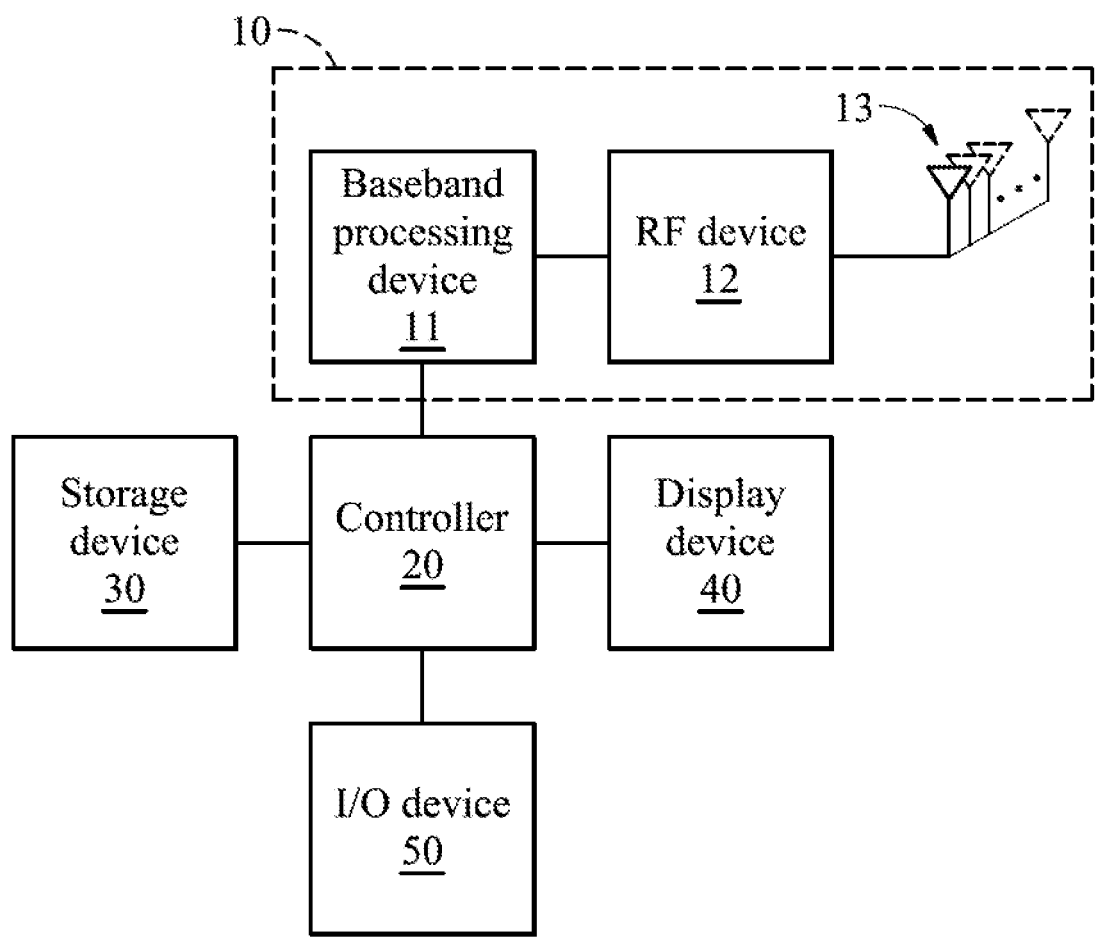
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 2100 MHz, or 2.6 GHz utilized in 4G (e.g., LTE/LTE-A/TD-LTE) systems, or may be any radio frequency (e.g., 30 GHz-300 GHz for mmWave, or 3.3 GHz-4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless transceiving with the mobile communication network 120, enabling the storage device 30 for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method for providing reliable delivery of application data.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including a Universal Integrated Circuit Card (UICC) (e.g., a Subscriber Identity Module (SIM) or Universal SIM (USIM) card), a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

Figure 3:
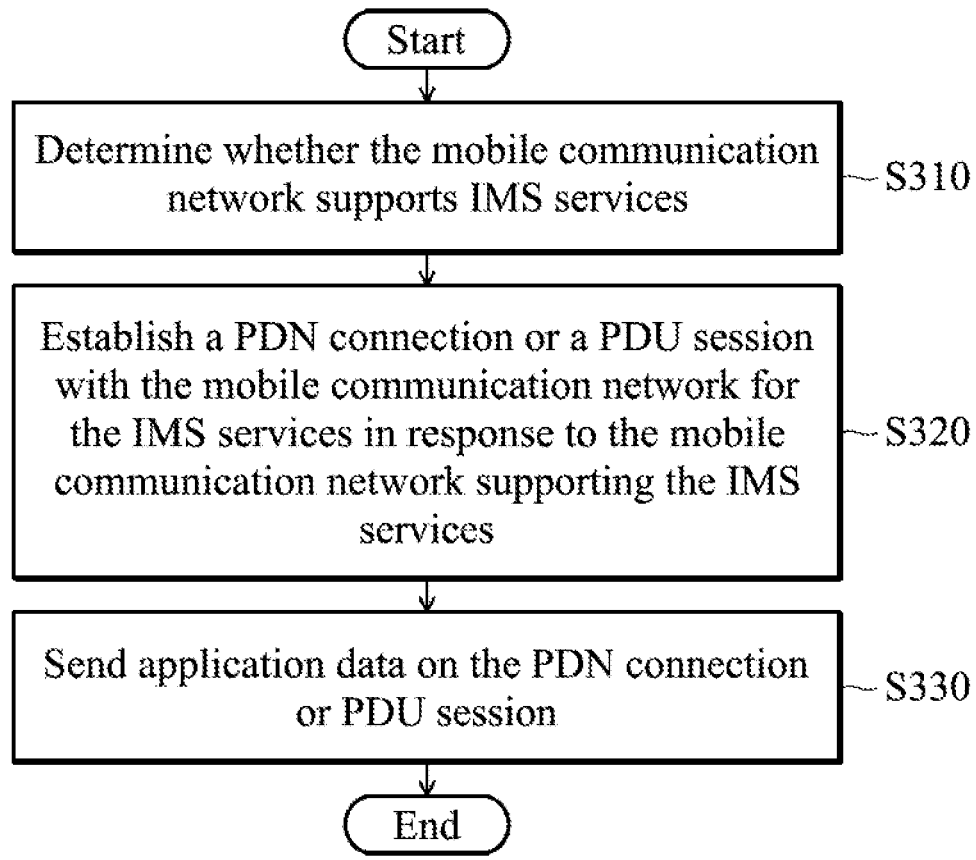
FIG. 3 is a flow chart illustrating the method for providing reliable delivery of application data according to an embodiment of the application.

FIG. 3 is a flow chart illustrating the method for providing reliable delivery of application data according to an embodiment of the application.

In this embodiment, the method is applied to and executed by a UE (e.g., the UE 110) communicatively connected to a mobile communication network (e.g., the mobile communication network 120) supporting the IMS services.

To begin with, the UE determines whether the mobile communication network supports the IMS services (step S310).

In one embodiment, the IMS services may refer to the IMS voice services. In another embodiment, the IMS services may refer to the IMS data services.

Next, the UE establishes a PDN connection or a PDU session with the mobile communication network for the IMS services in response to the mobile communication network supporting the IMS services (step S320).

In one embodiment, the UE establishes a PDN connection if the mobile communication network is a 4G network (e.g., an LTE/LTE-A/TD-LTE network). In another embodiment, the UE establishes a PDU session if the mobile communication network is a 5G network (e.g., an NR network).

After that, the UE sends application data on the PDN connection or PDU session (step S330).

In one embodiment, a session based solution for the cases where the mobile communication network supports IMS voice services may be applied using the operator unaware mode in which the operator is unaware of the application data being delivered over an existing audio/video RTP stream (i.e., the audio/video RTP stream that is conventionally defined for and used in an IMSVoPS session). Specifically, the UE may send a SIP INVITE message including Session Description Protocol (SDP) attributes which indicate using an audio or video RTP stream to send the application data on the PDN connection or PDU session. For example, the SDP attributes may include a session name field indicating an IMS Data over Packet Switched (IMSDoPS) session, a session information field indicating the type and the identifier of the application data, and a media information field indicating audio or video RTP. Alternatively, the UE may first send a SIP INVITE message to initiate a voice call session, and then send a SIP INVITE message (e.g., with the aforementioned SDP attributes) to modify the voice call session to an IMSDoPS session.

In another embodiment, a session based solution for the cases where the mobile communication network supports IMS data services may be applied using the operator aware mode in which the operator is aware of the application data being delivered over a separate RTP stream (i.e., an audio/video RTP stream that is newly defined and used in an IMSDoPS session). Specifically, the UE may send a SIP INVITE message including header fields which indicate using an audio or video RTP stream to send the application data on the PDN connection or PDU session. For example, the header fields may include a subject indication that indicates an IMSDoPS session, and a reason indication that indicates the type and the identifier of the application data.

In yet another embodiment, a non-session based solution for the cases where the mobile communication network supports IMS voice services may be applied using the operator unaware mode in which the operator is unaware of the application data being delivered over the existing text RTP stream (i.e., the text RTP stream that is conventionally defined for and used in text message delivery). Specifically, the UE may send the application data in a SIP message. For example, the application data may be sent as a plain text message (e.g., a Short Message Service (SMS) message) in the SIP message.

To further clarify, in the operator unaware mode, the existing audio/video/text RTP stream may be used to transmit the application data, and each application (e.g., each game) can use a predefined configuration by which both the sender and receiver know how to map the SDP to correct application, which codec to use, what bandwidth to request, and how to encode/decode the application data. FIGS. 4A and 4B show an example of said configuration regarding the mappings of applications to corresponding parameters for the operator unaware mode. In the operator aware mode, a separate RTP stream is used to transmit the application data, and the codec, bandwidth, and syntax can be defined by the operator.

Figure 5:
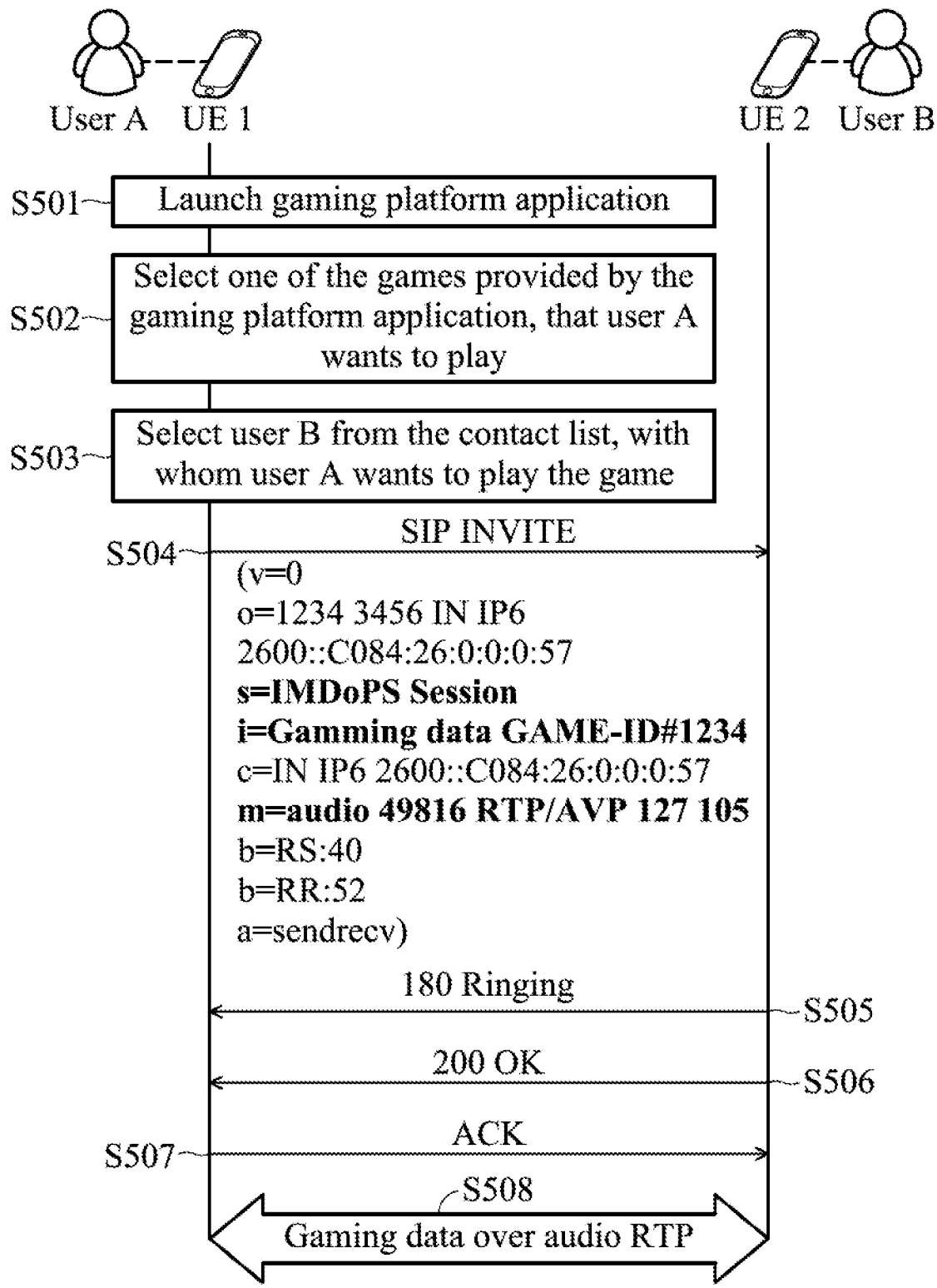
FIG. 5 is a message sequence chart illustrating the session based solution for delivering gaming data using the operator unaware mode according to an embodiment of the application.

FIG. 5 is a message sequence chart illustrating the session based solution for delivering gaming data using the operator unaware mode according to an embodiment of the application.

In this embodiment, the application data refers specifically to the gaming data of a certain gaming application, but the present application should not be limited thereto.

In step S501, user A launches a gaming platform application on UE 1.

In step S502, user A selects one of the games provided by the gaming platform application, that he/she wants to play.

In step S503, user A selects another user (e.g., user B) from the contact list, with whom he/she wants to play the game.

In step S504, user A starts the gaming session with user B, and in response, UE 1 sends a SIP INVITE message to UE 2. Specifically, the SDP attributes in the SIP INVITE message include a session name field indicating an IMSDoPS session (denoted as "s=IMSDoPS session" in FIG. 5), a session information field indicating the type and the identifier of the application data (denoted as "i=Gamming data GAME-ID #1234" in FIG. 5), and a media information field indicating audio or video RTP (denoted as "m=audio 49816 RTP/AVP 127 105" in FIG. 5). Moreover, in the SDP attributes, the "b" parameters are used to request suitable Quality of Service (QoS) and bandwidth based on the selected game.

Although not shown, before step S504, UE 1 may first establish a PDN connection or a PDU session with the mobile communication network supporting IMS voice services.

In step S505, UE 2 responds to the SIP INVITE message by sending a response message (i.e., 180 Ringing) to UE 1 to indicate that the callee (i.e., user B) is being alerted.

In step S506, UE 2 further sends another response message (i.e., 200 OK) to UE 1 to indicate that the call (i.e., the gaming session) has been answered.

In step S507, UE 1 sends an acknowledgement (i.e., ACK) message to UE 2 to confirm the reception of the final response (i.e., the 200 OK response).

In step S508, UE 1 and UE 2 start to deliver the gaming data over the audio RTP stream.

Figure 6A:
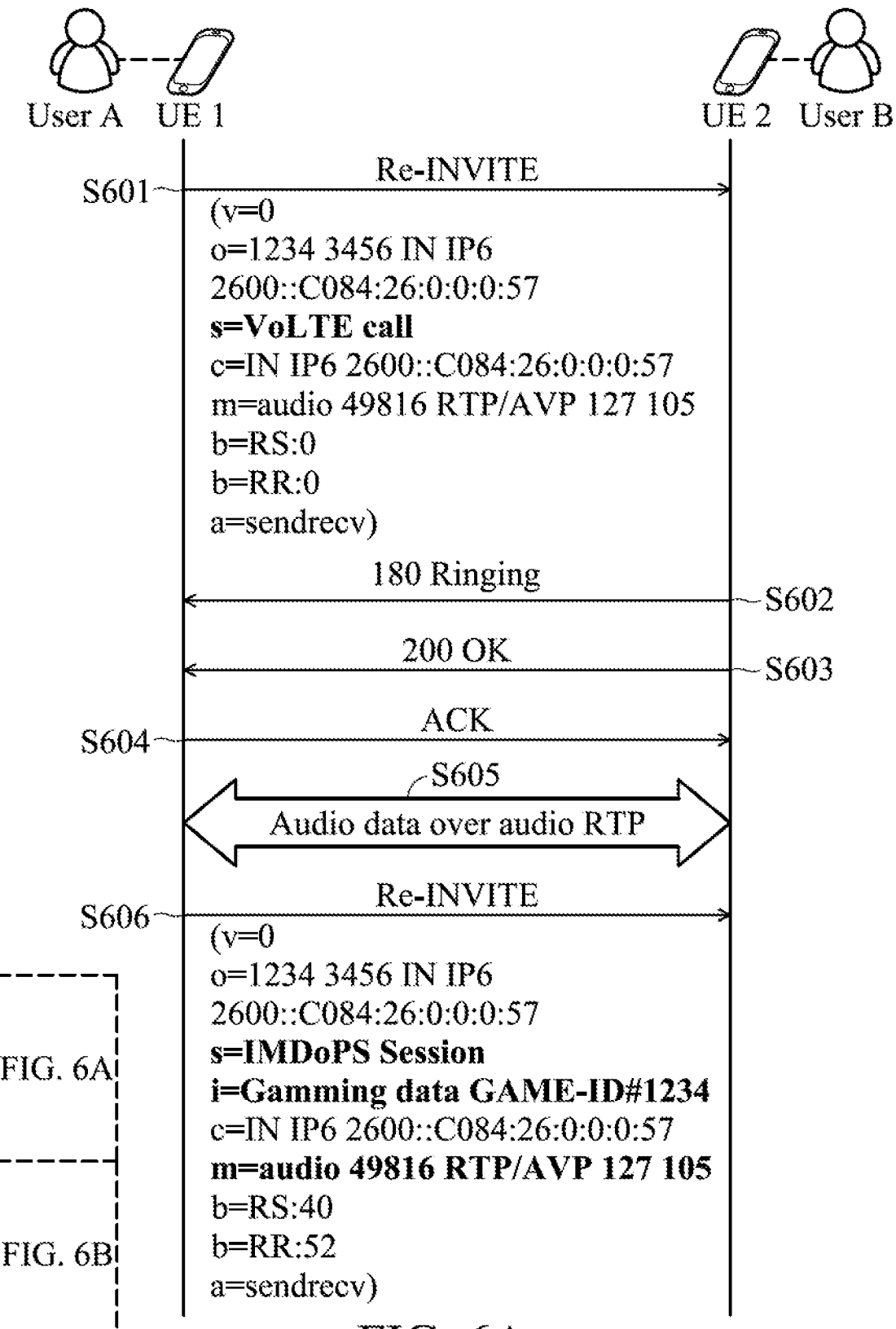
FIGS. 6A and 6B show a message sequence chart illustrating the session based solution for delivering gaming data using the operator unaware mode according to another embodiment of the application.
Figure 6B:
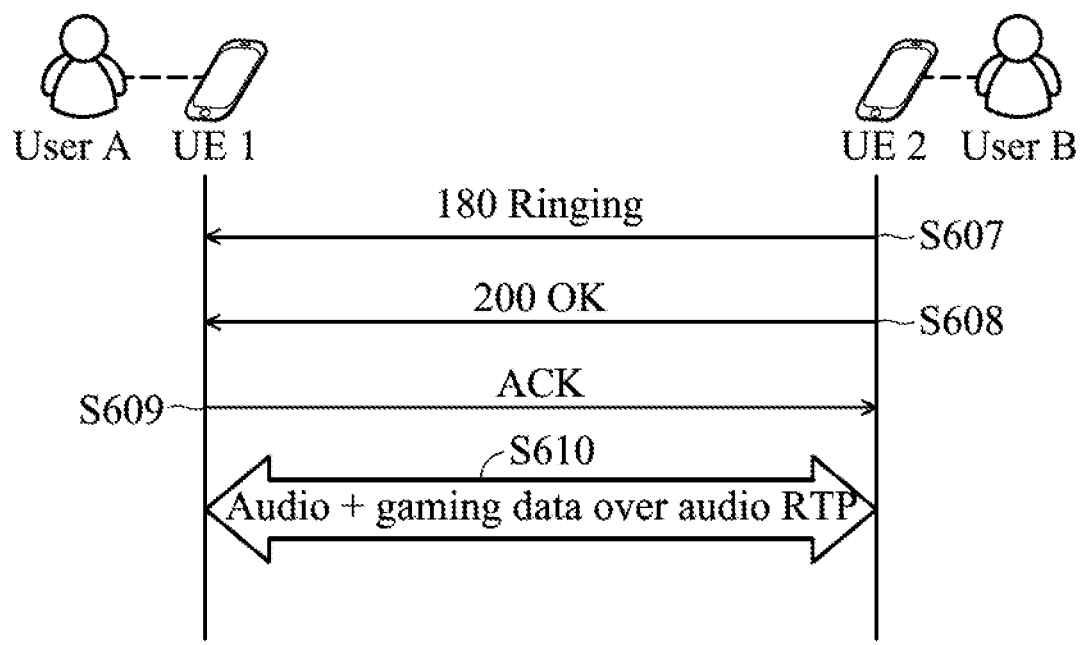

FIGS. 6A and 6B show a message sequence chart illustrating the session based solution for delivering gaming data using the operator unaware mode according to another embodiment of the application.

In this embodiment, the application data refers specifically to the gaming data of a certain gaming application, but the present application should not be limited thereto.

In step S601, user A starts a VoLTE call with user B, and correspondingly, UE 1 sends a SIP INVITE message to UE 2. Specifically, the SDP attributes in the SIP INVITE message include a session name field indicating a VoLTE call (denoted as "s=VoLTE call" in FIG. 6A), and a media information field indicating audio or video RTP (denoted as "m=audio 49816 RTP/AVP 127 105" in FIG. 6A).

Although not shown, before step S601, UE 1 may first establish a PDN connection or a PDU session with the mobile communication network supporting IMS voice services.

In step S602, UE 2 responds to the SIP INVITE message by sending a response message (i.e., 180 Ringing) to UE 1 to indicate that the callee (i.e., user B) is being alerted.

In step S603, UE 2 further sends another response message (i.e., 200 OK) to UE 1 to indicate that the call has been answered.

In step S604, UE 1 sends an acknowledgement (i.e., ACK) message to UE 2 to confirm the reception of the final response (i.e., the 200 OK response).

In step S605, UE 1 and UE 2 start to deliver the audio data over the audio RTP stream.

During the VoLTE call, user A and user B decide to update the call to an audio plus gaming call, and in response, UE 1 sends a Re-INVITE message to UE 2 (step S606). Specifically, the Re-INVITE message is another SIP INVITE message with different SDP attributes which include a session name field indicating an IMSDoPS session (denoted as "s=IMSDoPS session" in FIG. 6A), a session information field indicating the type and the identifier of the application data (denoted as "i=Gamming data GAME-ID #1234" in FIG. 6A), and a media information field indicating audio or video RTP (denoted as "m=audio 49816 RTP/AVP 127 105" in FIG. 6A). Moreover, in the SDP attributes, the "b" parameters are used to request suitable Quality of Service (QoS) and bandwidth based on the selected game.

Although not shown, before step S606, user A or user B may launch the gaming platform application and select the game to play and the contact to play it with, similar to steps S501~S503 in the embodiment of FIG. 5.

In step S607, UE 2 responds to the SIP INVITE message by sending a response message (i.e., 180 Ringing) to UE 1 to indicate that the callee (i.e., user B) is being alerted.

In step S608, UE 2 further sends another response message (i.e., 200 OK) to UE 1 to indicate that the call (i.e., the gaming session) has been answered.

In step S609, UE 1 sends an acknowledgement (i.e., ACK) message to UE 2 to confirm the reception of the final response (i.e., the 200 OK response).

In step S610, UE 1 and UE 2 start to deliver the audio and gaming data over the audio RTP stream.

Figure 7:
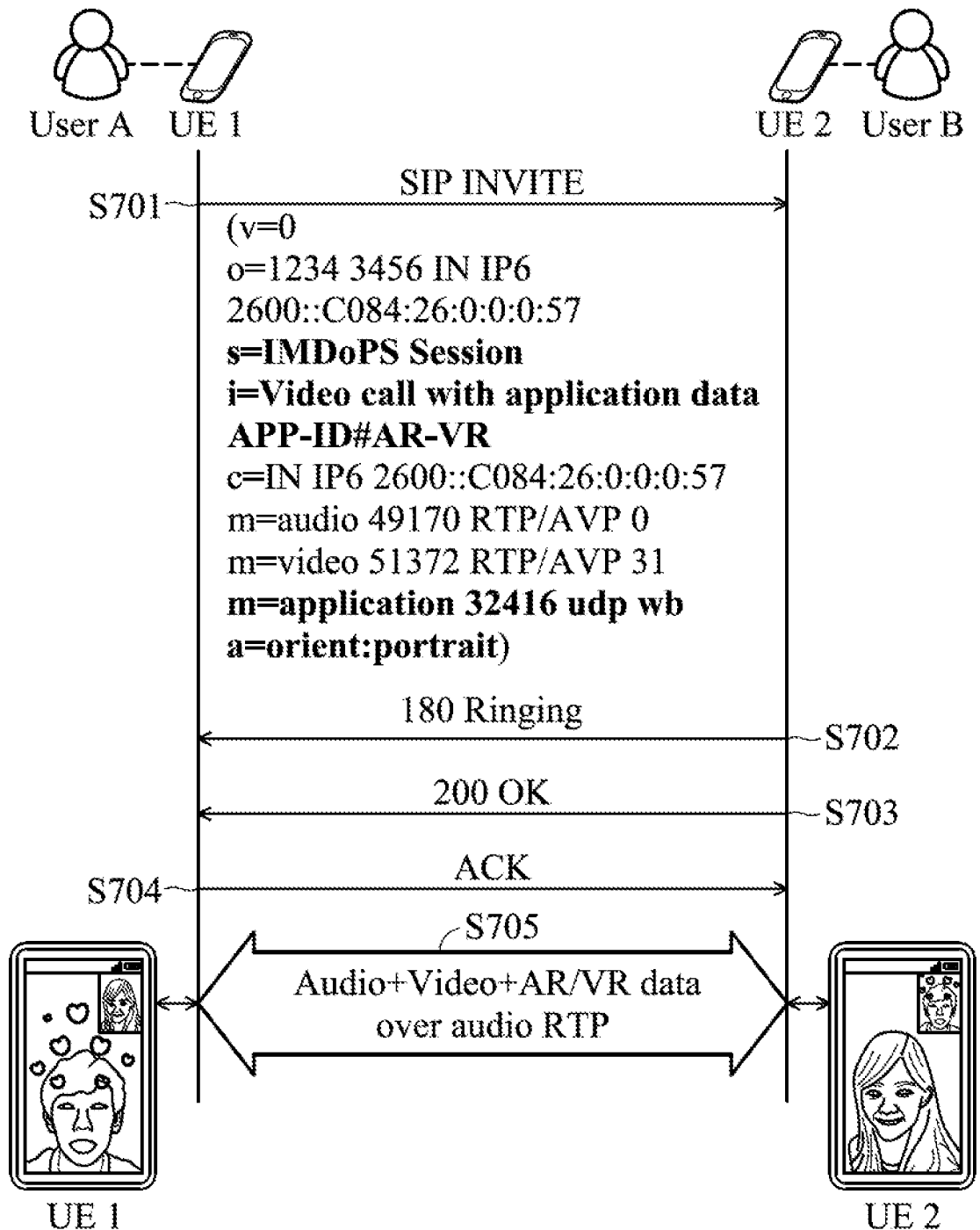
FIG. 7 is a message sequence chart illustrating the session based solution for delivering gaming data using the operator unaware mode according to an embodiment of the application.

FIG. 7 is a message sequence chart illustrating the session based solution for delivering gaming data using the operator unaware mode according to an embodiment of the application.

In this embodiment, the application data refers specifically to the AR/VR data, but the present application should not be limited thereto.

In step S701, user A decides to initiate a video call plus the AR/VR feature with user B, and in response, UE 1 sends a SIP INVITE message to UE 2. Specifically, the SDP attributes in the SIP INVITE message include a session name field indicating an IMSDoPS session (denoted as "s=IMSDoPS session" in FIG. 7), a session information field indicating the type and the identifier of the application data (denoted as "i=Video call with application data APP-ID #AR-VR" in FIG. 7), a first media information field indicating audio RTP (denoted as "m=audio 49170 RTP/AVP 0" in FIG. 7), a second media information field indicating video RTP (denoted as "m=video 51372 RTP/AVP 31" in FIG. 7), a third media information field indicating the AR/VR application (denoted as "m=application 32416 udp wb" in FIG. 7), and a media attribute field for the AR/VR application (denoted as "a=orient:portrait" in FIG. 7). Moreover, the AR/VR m line may indicate that the codec to be used is AVC/H.264, HEVC/H.265, VP8, or VP9.

Although not shown, before step S701, UE 1 may first establish a PDN connection or a PDU session with the mobile communication network supporting IMS voice services.

In step S702, UE 2 responds to the SIP INVITE message by sending a response message (i.e., 180 Ringing) to UE 1 to indicate that the callee (i.e., user B) is being alerted.

In step S703, UE 2 further sends another response message (i.e., 200 OK) to UE 1 to indicate that the call (i.e., the gaming session) has been answered.

In step S704, UE 1 sends an acknowledgement (i.e., ACK) message to UE 2 to confirm the reception of the final response (i.e., the 200 OK response).

In step S705, UE 1 and UE 2 start to deliver audio, video, and AR/VR data over the audio RTP stream.

Figure 8A:
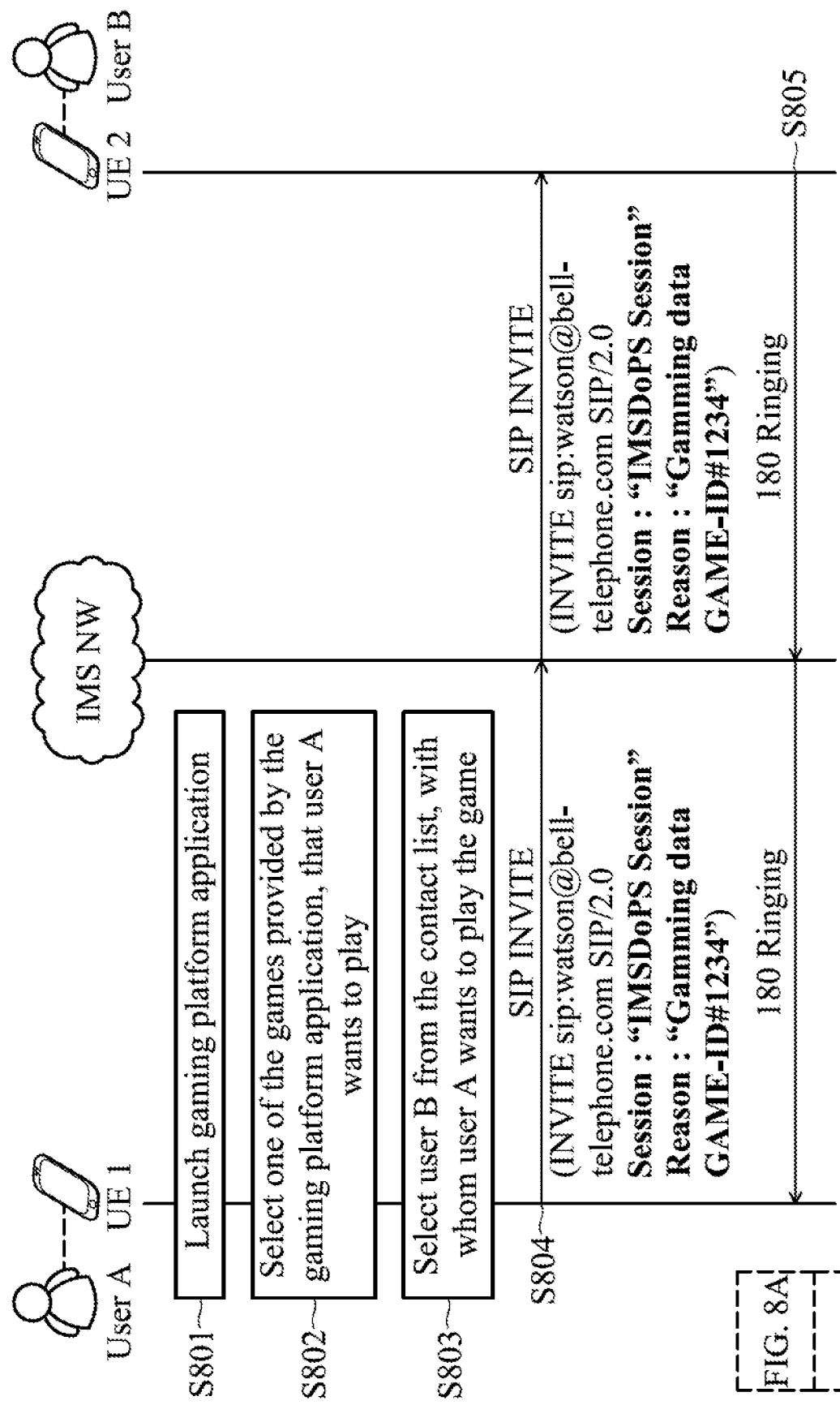
FIGS. 8A and 8B show a message sequence chart illustrating the session based solution for delivering gaming data using the operator aware mode according to an embodiment of the application.
Figure 8B:
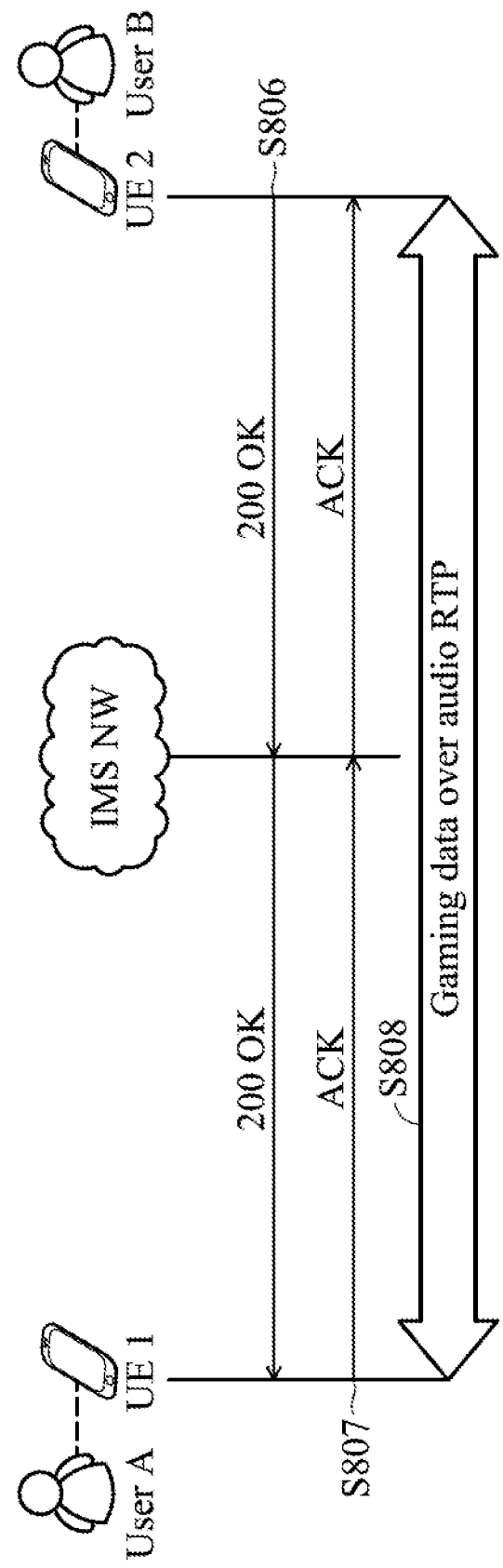

FIGS. 8A and 8B show a message sequence chart illustrating the session based solution for delivering gaming data using the operator aware mode according to an embodiment of the application.

In this embodiment, the application data refers specifically to the gaming data of a certain gaming application, but the present application should not be limited thereto.

In step S801, user A launches a gaming platform application on UE 1.

In step S802, user A selects one of the games provided by the gaming platform application, that he/she wants to play.

In step S803, user A selects another user (e.g., user B) from the contact list, with whom he/she wants to play the game.

In step S804, user A starts the gaming session with user B, and in response, UE 1 sends a SIP INVITE message to UE 2 via the IMS network. Specifically, the header fields of the SIP INVITE message include a subject indication that indicates an IMSDoPS session (denoted as "Session: "IMSDoPS"" in FIG. 8A), and a reason indication that indicates the type and the identifier of the application data (denoted as "Reason: "Gamming data GAME-ID #1234" in FIG. 8A). Upon receiving the SIP INVITE message, the IMS network may identify the request is for delivery of application data over an audio RTP stream in an IMSDoPS session, and based on the game ID (i.e., 1234), the IMS network may need to determine the codec, bandwidth, and syntax for this game as defined by the operator, before forwarding the SIP INVITE message to UE 2.

Although not shown, before step S804, UE 1 may first establish a PDN connection or a PDU session with the mobile communication network supporting IMS voice services.

In step S805, UE 2 responds to the SIP INVITE message by sending a response message (i.e., 180 Ringing) to UE 1 via the IMS network to indicate that the callee (i.e., user B) is being alerted.

In step S806, UE 2 further sends another response message (i.e., 200 OK) to UE 1 via the IMS network to indicate that the call (i.e., the gaming session) has been answered.

In step S807, UE 1 sends an acknowledgement (i.e., ACK) message to UE 2 via the IMS network to confirm the reception of the final response (i.e., the 200 OK response).

In step S808, UE 1 and UE 2 start to deliver the gaming data over the audio RTP stream.

Figure 9A:
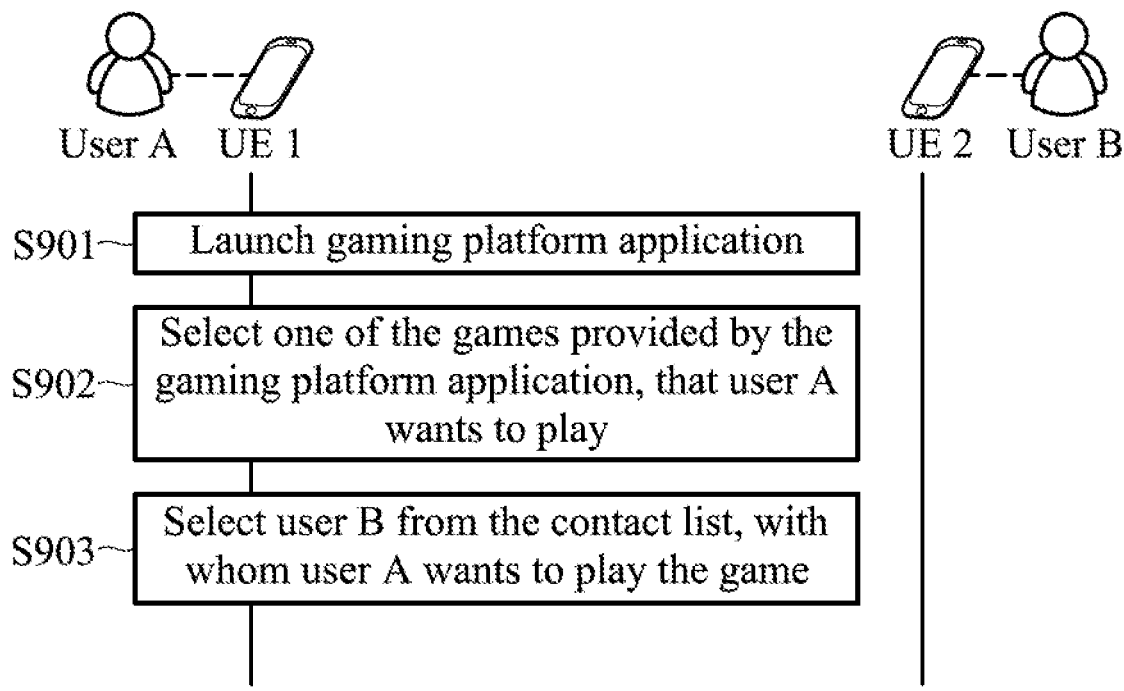
FIGS. 9A and 9B show a message sequence chart illustrating the non-session based solution for delivering gaming data using the operator unaware mode according to an embodiment of the application.
Figure 9B:
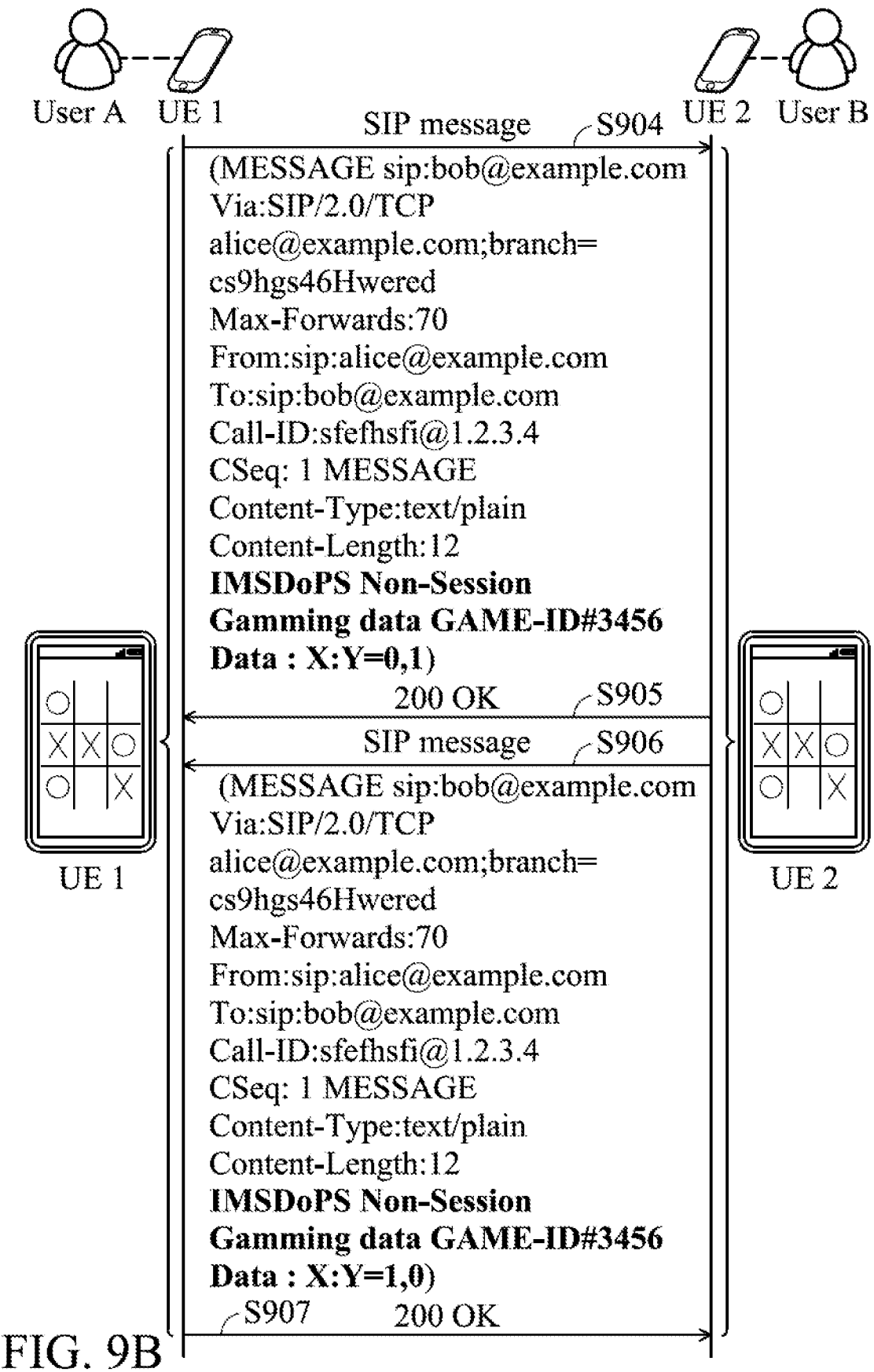

FIGS. 9A and 9B show a message sequence chart illustrating the non-session based solution for delivering gaming data using the operator unaware mode according to an embodiment of the application.

In this embodiment, the application data refers specifically to the gaming data of a certain gaming application, but the present application should not be limited thereto.

In step S901, user A launches a gaming platform application on UE 1.

In step S902, user A selects one of the games provided by the gaming platform application, that he/she wants to play.

In step S903, user A selects another user (e.g., user B) from the contact list, with whom he/she wants to play the game.

In step S904, user A starts the gaming session with user B, and in response, UE 1 sends a SIP message to UE 2. Specifically, the content of the SIP message includes a special game string indicating "IMSDoPS Non-Session; Gamming data GAME-ID #3456; Data: X:Y=0, 1" in FIG. 9B). For example, the special game string may be understood as a plain text message (e.g., an SMS message) carried in the SIP message.

Although not shown, before step S904, UE 1 may first establish a PDN connection or a PDU session with the mobile communication network supporting IMS data services.

In step S905, UE 2 responds to the SIP message by sending a response message (i.e., 200 OK) to UE 1.

In step S906, UE 2 sends a SIP message to UE 1. Specifically, the content of the SIP message includes a special game string indicating "IMSDoPS Non-Session; Gamming data GAME-ID #3456; Data: X:Y=1, 0" in FIG. 9B).

In step S907, UE 1 responds to the SIP message by sending a response message (i.e., 200 OK) to UE 2.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
   a wireless transceiver, configured to perform wireless transmission and reception to and from a mobile communication network; and
   a controller, configured to determine whether the mobile communication network supports IP Multimedia Subsystem (IMS) services, establish a Packet Data Network (PDN) connection or a Protocol Data Unit (PDU) session with the mobile communication network for the IMS services via the wireless transceiver in response to the mobile communication network supporting the IMS services, sends, via the wireless transceiver, a first Session Initiation Protocol (SIP) INVITE message comprising Session Description Protocol (SDP) attributes which indicate using an audio or video Real-Time Protocol (RTP) stream to send the application data on the PDN connection or PDU session, and send application data on the PDN connection or PDU session via the wireless transceiver.

2. The UE as claimed in claim 1, wherein the IMS services comprise IMS voice services.

3. The UE as claimed in claim 2, wherein the SDP attributes comprise a session name field indicating an IMS Data over Packet Switched (IMSDoPS) session, a session information field indicating a type and an identifier of the application data, and a media information field indicating audio or video RTP.

4. The UE as claimed in claim 2, wherein the controller further sends, via the wireless transceiver, a second SIP INVITE message to initiate a voice call session prior to sending the first SIP INVITE message, and the first SIP INVITE message is sent to modify the voice call session to an IMSDoPS session.

5. The UE as claimed in claim 1, wherein the IMS services comprise IMS data services.

6. The UE as claimed in claim 5, wherein the controller further sends, via the wireless transceiver, a SIP INVITE message comprising header fields which indicate using an audio or video RTP stream to send the application data on the PDN connection or PDU session.

7. The UE as claimed in claim 6, wherein the header fields comprise a subject indication that indicates an IMSDoPS session, and a reason indication that indicates a type and an identifier of the application data.

8. The UE as claimed in claim 1, wherein the application data comprises one of the following:
   gaming data;
   Virtual Reality (VR), Augmented Reality (AR), or Mixed Reality (MR) data; and
   medical data.

9. A method, executed by User Equipment (UE), comprising:
   determining whether a mobile communication network supports IMS services;
   establishing a PDN connection or a PDU session with the mobile communication network for the IMS services in response to the mobile communication network supporting the IMS services;
   sending a first SIP INVITE message comprising SDP attributes which indicate using an audio or video RTP stream to send the application data on the PDN connection or PDU session; and
   sending application data on the PDN connection or PDU session.

10. The method as claimed in claim 9, wherein the IMS services comprise IMS voice services.

11. The method as claimed in claim 9, wherein the SDP attributes comprise a session name field indicating an IMSDoPS session, a session information field indicating a type and an identifier of the application data, and a media information field indicating audio or video RTP.

12. The method as claimed in claim 9, further comprising:
    sending a second SIP INVITE message to initiate a voice call session prior to sending the first SIP INVITE message;
    wherein the first SIP INVITE message is sent to modify the voice call session to an IMSDoPS session.

13. The method as claimed in claim 9, wherein the IMS services comprise IMS data services.

14. The method as claimed in claim 13, further comprising:
    sending a SIP INVITE message comprising header fields which indicate using an audio or video RTP stream to send the application data on the PDN connection or PDU session.

15. The method as claimed in claim 14, wherein the header fields comprise a subject indication that indicates an IMSDoPS session, and a reason indication that indicates a type and an identifier of the application data.

16. The method as claimed in claim 9, wherein the application data comprises one of the following:
   gaming data;
   Virtual Reality (VR), Augmented Reality (AR), or Mixed Reality (MR) data; and
   medical data.

\* \* \* \* \*